Nov. 18, 1969  C. A. MOUNTEER  3,478,571
APPARATUS AND TECHNIQUE FOR CALIBRATING PRESSURE GAUGES
Filed Dec. 20, 1967
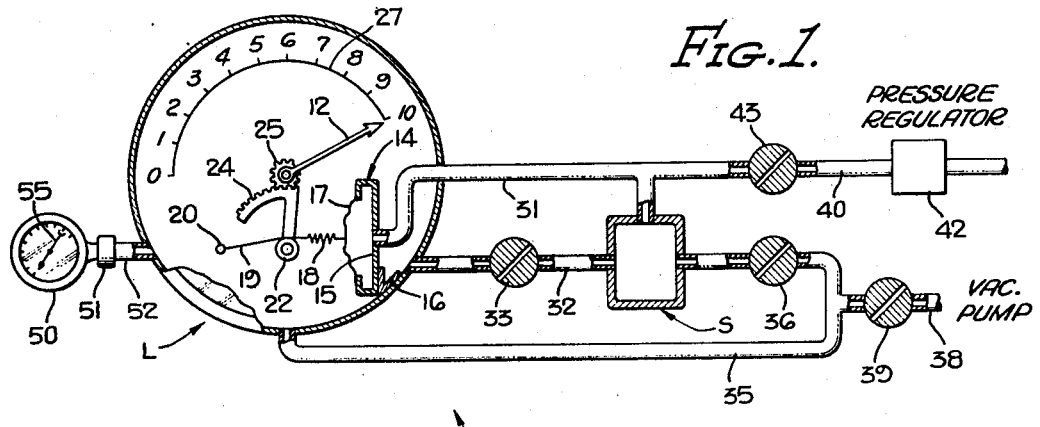
Fig. 1.
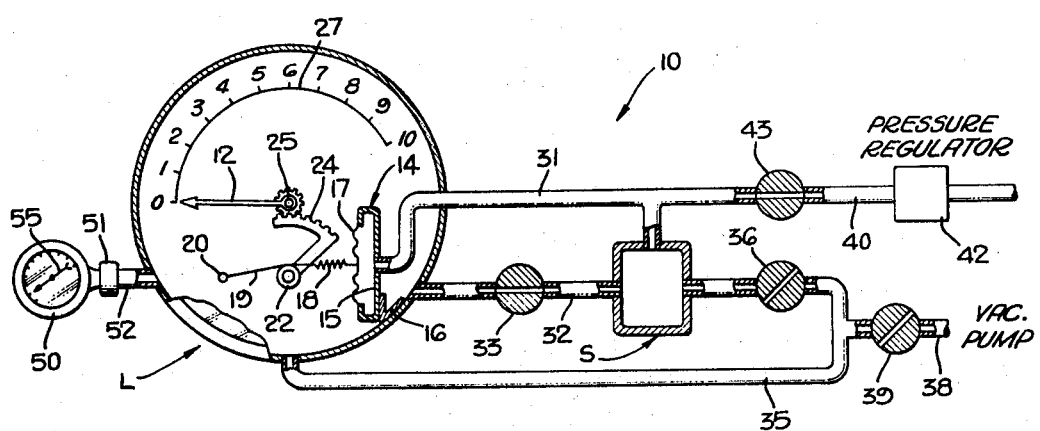
Fig. 2.
CARLYLE A. MOUNTEER,
INVENTOR.
BY 
ATTORNEYS United States Patent Office 3,478,571
Patented Nov. 18, 1969

3,478,571
APPARATUS AND TECHNIQUE FOR CALIBRATING PRESSURE GAUGES
Carlyle A. Mounteer, 1250 Sierra Madre Villa Ave., Pasadena, Calif.
Filed Dec. 20, 1967, Ser. No. 692,115
Int. Cl. G01l 27/00
U.S. Cl. 73—4                                    7 Claims

ABSTRACT OF THE DISCLOSURE

A high precision absolute pressure calibrating apparatus and technique utilizing two chambers of widely differing known volumetric capacities separated by the pressure sensitive sensor of a differential pressure indicator. Successive determinable masses of gas are added to the larger chamber after closing off the larger from the smaller chamber and using a constant setting of the differential pressure indicator to determine when the smaller chamber is filled with a new charge of the identical mass as the first one of said successive charges. It is then known that the release of this new charge into the large chamber will increase that chamber's pressure by another identical increment. The pressure instrument being calibrated is subject to the pressure in the large chamber which may and preferably does comprise the sealed housing of the different pressure indicator.

---

This invention relates to calibrating apparatus and more particularly to an improved simplified apparatus and technique for the precision calibration of pressure gauges and more particularly those designed to measure absolute pressure.

The principles of this invention can be practiced by connecting two chambers of widely differing accurately known volumetric capacities to the opposite sides of the sensor of a differenial pressure gauge and by appropriate valved provisions for first evacuating these chambers and then releasing successive quantities of gas from the smaller to the larger chamber as determined by an identical reading of the differential pressure gauge during each recharging of the smaller chamber. However, certain advantages are achieved by utilizing a sealed housing of a differential gauge as one of the two gas chambers and preferably the larger one of these chambers. Accordingly, the invention will be described by way of example and without limiting the scope thereof using the referred to simple version of the essential apparatus.

The basic concept of the invention involves the utilization of a differential pressure standard in a simple expedient manner to calibrate absolute pressure gauges of very low range. This is achieved typically by expanding a small volume of relatively high pressure gas under a predetermined differential pressure relative to the pressure of a larger volume of gas. The two volumes may be separated by the pressure sensor of a precision differential manometer and, in fact, and in the interest of simplicity, the larger volume may comprise the housing for the manometer or differential gauge. An important feature of the invention fundamental to its many advantages is the fact that the utilization of the pressure sensor between the gas chambers permits the user to expand successive highly uniform masses of gas from the smaller into the larger chamber by employing the same predetermined pressure reading of the manometer to facilitate the expeditious and accurate determination of these uniform masses of gas. In this way the user is enabled to determine with precision successive calibration points on the scale of a gauge undergoing calibration and having its sensor connected to the interior of the larger chamber of the invention apparatus.

It is therefore a primary object of the present invention to provide a high precision pressure gauge calibrating apparatus featuring simplicity, accuracy and low cost.

Another object of the invention is the provision of a precision technique for calibrating an absolute pressure instrument by releasing successive determinable masses of gas into a much larger chamber initially evacuated to a low pressure and characterized in that the determinable masses of gas are determined by filling a small chamber with gas to the same identical pressure differential relative to that of the gas in a second and larger chamber.

Another object of the invention is the provision of a pressure calibrating apparatus utilizing the sealed housing of a differential pressure gauge as a large chamber into which to release successive determinable masses of gas having a pressure value represented by a small increment on the scale of the instrument undergoing calibration.

Another object of the invention is the provision of an improved simplified technique for calibrating an absolute pressure gauge utilizing two chambers of grossly different relative volumes in communication with one another through a positive cut-off means and the larger of which chambers comprises the housing of a high sensitivity differential pressure sensor having one side exposed to the interior of the larger housing and its other side in communication with the smaller chamber.

These and other more specific objects will appear upon reading the following specification and claims and upon considering in connection therewith the attached drawing to which they relate.

Referring now to the drawing in which a preferred embodiment of the invention is illustrated.

FIGURE 1 is a diagrammatic view of apparatus for calibrating a pressure gauge according to the invention and showing the parts in the position occupied before first gas charge is released from the small chamber into the housing for the differential pressure sensor; and FIGURE 2 is a view similar to FIGURE 1 but showing the position of the parts as the first gas charge is released into the larger chamber.

Referring to FIGURES 1 and 2, there is shown generally schematically one preferred embodiment of the apparatus designated generally 10 suitable for practicing the present invention. This apparatus includes the sealed or fluid-tight housing L of a differential pressure gauge having a suitable transparent cover through which the indicator needle 12 and graduated scale 27 of the gauge is visible. Housing L encloses any suitable differential pressure sensor such as a highly sensitive aneroid cell 14 having an inflexible main body disk 15 rigidly supported on housing L, as by a bracket 16. The periphery of a highly sensitive and flexible diaphragm 17 is sealed to the rim of disk 15. Suitably secured to the center of diaphragm 17 is a tension spring 18 and having its other end secured to a flexible filament 19 having anchored at its remote end a post or the like 20 fixed to the interior of housing L. Filament 19 is wrapped about and effective to rotate a spindle 22 supported in bearings in a manner well known to those skilled in the instrument art and carrying a toothed arm 24 mating with the teeth of a pinion 25 effective to rotate the needle 12 over the graduated instrument scale 27.

As herein shown, scale 27 is graduated in major increments numbered zero through 10 pounds per square inch or in millimeters of mercury, as preferred, with the scale indicia distributed over a long arcuate scale. It will be understood that when the pressure on the opposite sides of diaphragm 17 is the same indicator needle 12 will be in its null position with the pointer opposite the zero reading on scale 27.

Positioned closely adjacent large chamber L is a second and much smaller chamber or housing S having its interior in communication through duct 31 with the interior of differential pressure sensor 14. A second conduit 32 provided with a valve or the like positive cut-off device 33 connects the interiors of large housing L and small housing S. A third conduit 35 likewise connects the interiors of the two housings and is controlled by a normally closed cut-off valve 36. A branchoff conduit 38 leads from conduit 35 to a very high vacuum creating device, not shown, of any suitable character and is normally closed by a positive cut-off valve 39.

As herein shown, the small housing or chamber S can be charged with gas from a suitable source via a conduit 40 and a precision pressure regulator device 42 of any suitable character. The low pressure side of regulator 42 opens into conduit 31 and housing 30 through a manually operable cut-off valve 43.

It will be understood that the capacity of chamber S and of the conduits leading therefrom to the opposite sides of the sensitive daphragm 17 is many times smaller than the capacity of housing L by some known ratio, as 1 to 100, 1 to 1,000, or any other convenient ratio.

The described apparatus and equipment is employed in the following manner.

Let it be assumed that it is desired to check or calibrate an absolute pressure gauge 50. This gauge is detachably connected to the interior of housing L through coupling 51 and nipple 52. After making certain that a leak-proof connection of the instrument has been made to nipple 52, the operator prepares the equipment for use by opening valves 36 and 39 and closing valves 33 and 43. The vacuum pump, not known, is then operated until all interior parts of the equipment in communication with the vacuum pump have been highly evacuated and preferably to a pressure less than 0.025 millimeter of mercury. Valves 36 and 39 are then tightly closed.

The next step is to charge chamber S with a precise mass of gas accomplished by introducing gas to a selected pressure, such as 10 p.s.i.g. This is done by opening valve 43 to a source of pressurized gas and gradually charging housing 30 until needle 12 comes to rest at a selected reading on the upper end of scale 27. Having ascertained that the needle is precisely in this position when valve 43 is fully closed, the operator then knows that a precise volume of gas under the exact pressure indicated by needle 12 is present in chamber S and in the closed off conduits and the interior of the pressure sensing cell 14 in communication therewith, it being understood that at this time, all valves are closed and in the positions illustrated in FIGURE 1.

The operator then opens valve 33 releasing the captive known mass of gas for flow through conduit 32 into the interior of large chamber L and allows the pressure in the two chambers to reach equilibrium. The pressure on the opposite sides of the sensitive sensing diaphragm 17 then being the same, spring 18 controlling the position of needle 12 operates to return this needle to its zero position. However, needle 55 of gauge 50 undergoing calibration will have advanced from its zero position to a precisely known first calibrated position. For example, let it be assumed that the larger chamber L has a volume 1,000 times greater than that of the smaller chamber S and the portions of the conduit in direct communication therewith, and more specifically, that the volumes of the two chambers on the opposite sides of sensor diaphragm 17 and valve 33 are 3.0 and 2997.0 cubic centimeters. In other words, the volume of two chambers when valve 33 is open is 3,000 cubic centimeters or 1,000 times the volume of chamber S with valve 33 closed.

Let it be assumed that a pressure differential of 10.0 p.s.i. has been selected for use in measuring the successive determinable masses of gas to be released into larger chamber L to establish the successive calibration points on the instrument undergoing calibration. Hence, $$\Delta P_1 = 10.0 \text{ p.s.i.}$$

When this mass of gas is released into chamber L, the equilibrium pressure $P_e$ in the two chambers will be:

$$P_e = \frac{P_1 \times V_S}{V_S + V_L} + \frac{P_L \times V_L}{V_S + V_L}$$

$$P_e = \frac{10.0 \times 3.0}{3.0 + 2997} + \frac{0.0 \times 2997}{3.0 + 2997} = 0.01 \text{ p.s.i.a.}$$

Valve 33 is now closed and chamber S is pressurized to 10.01 p.s.i.a. by admitting gas via open valve 43 and pressure regulator 42 until needle 12 of the differential gauge reads precisely the same as it did when establishing the first calibration point of 0.01 p.s.i.a. The new equilibrium pressure $P'_e$ established after opening valve 33 will be $$P'_e = \frac{10.01 \times 3.0}{3000} + \frac{0.01 \times 2997}{3000}$$

$$= 0.01001 + 0.00999 = 0.02 \text{ p.s.i.a.}$$

Similarly, each of the additional calibration points obtained by repeating this same procedure will increase in uniform increments of 0.01 p.s.i.a. until the entire scale of the instrument has been checked or calibrated.

The operator continues the calibration operation in this same manner which merely involves the manipulation of valves 33 and 43 in the order described above and noting, at the end of each calibrating cycle, the corresponding newly established position of needle 55 on the scale of the instrument being calibrated. As is readily apparent, no particular skill or knowledge of calibration techniques is required on the part of the operator and any responsible person capable of making accurate observations and following the described simple procedure can perform highly accurate and reliable calibration operations. Some users prefer to note the individual readings of needle 55 and to enter these in order on a calibration report. Others prefer to graduate the instrument scale directly opposite the end of the pointer as each new calibration point is established thereby providing a scale tailor-made to that particular instrument.

In conclusion, it is pointed out that the gauge undergoing calibration may be connected to any part of the system subject to equilibrium pressure conditions after opening valve 33. Although an aneroid type pressure sensor has been shown by way of illustration, it will be understood that various other types of pressure sensors having the requisite accuracy and precision may be employed, including liquid charged manometers, bellows type sensors, and others well known to those skilled in this art.

While the particular apparatus and technique for calibrating pressure gauges herein shown and disclosed in detail is fully capable of attaining the objects and providing the advantages hereinabove stated, it is to be understood that it is merely illustrative of the presently preferred embodiments of the invention and that no limitations are intended to the details of construction or design herein shown.

I claim:

1. That method of establishing with precision a series of equal value absolute pressure increments on the scale of a pressure sensing instrument which method comprises: connecting the instrument undergoing calibration to the larger of a pair of chambers of grossly disproportionate known relative volumes interconnected by a differential pressure sensor, evacuating both of said chambers, admitting gas to the smaller one of said chambers until said pressure differential sensor indicates a selected pressure value at which time a determinable mass of gas is present in the smaller chamber, interconnecting the two chambers so that a fixed percentage of said mass of gas flows into the larger of said chambers to establish a first calibration point on the scale of the instrument undergoing calibration, the percentage being determined by the relative size of the two chambers, and thereafter establishing additional successive uniform increment calibration points by successively recharging said smaller chamber with an equal mass of gas by adding gas until the differential sensor reads exactly the same selected value as during the initial charge and then releasing these successive charges of gas into said larger chamber and each time noting the position of the indicator of the pressure sensor being calibrated.

2. That method defined in claim 1 characterized in the step of providing a gas-tight housing for said pressure sensor and utilizing said housing as the larger one of said pair of chambers.

3. That method defined in claim 2 characterized in the step of providing for the detachable connection of an instrument to be calibrated to the interior of the larger one of said pair of chambers.

4. That method defined in claim 1 characterized in the step of utilizing pressure regulating means to regulate the recharging of the smaller of said pair of chambers with gas from a pressurized supply thereof, and positively discontinuing the flow of gas to said smaller chamber precisely when the pressure therein reaches said selected pressure value above the then existing pressure in the larger of said pair of chambers.

5. High precision apparatus for use in precisely calibrating an absolute pressure gauge, first and second chambers having grossly different accurately known relative volumes, said second chamber having the larger volume, differential pressure means having a sensor positioned to sense and indicate the differential pressure between said chambers, control means for selectively placing said chambers in direct communication and for separating them in a gas-tight manner, means for adding gas to said first chamber until said differential pressure means reaches a selected position following which said control means is operable to allow the gas in said first and second chambers to reach equilibrium thereby establishing a first calibration point, and said apparatus being operable to release similarly established additional determinable masses of gases from the first into said second chamber to establish successive additional calibration points of uniform increments.

6. Calibrating apparatus as defined in claim 5 characterized in that said differential pressure sensor means includes a housing which serves additionally as the larger one of said first and second chambers.

7. Calibrating apparatus as defined in claim 5 characterized in the provision of pressure regulating means to facilitate recharging the smaller one of said pair of chambers with pressurized gas without exceeding the preselected pressure differential between that then existing in the larger chamber and the pressure in the smaller chamber.

References Cited

UNITED STATES PATENTS

| | | | |
|---|---|---|---|
| 585,883 | 7/1897 | Bosworth | 73—4 |
| 3,034,332 | 5/1962 | Lederer | 73—4 |

LOUIS C. POST III, Primary Examiner